Patented Jan. 21, 1947

2,414,682

UNITED STATES PATENT OFFICE 2,414,682

PRODUCTION OF PANTOTHENIC ACID AND OTHER RELATED GROWTH PROMOTING SUBSTANCES

Roger J. Williams, Austin, Tex., assignor to Research Corporation, New York, N. Y., a corporation of New York No Drawing. Application April 8, 1940, Serial No. 328,526

9 Claims. (Cl. 260—534)

This invention relates to the production of pantothenic acid and other growth promoting substances by synthetic means.

This application is a continuation in part of my co-pending application Serial No. 265,799, filed April 3, 1939, for Preparation of growth promoting substances.

Pantothenic acid is thought to have the structure represented by the formula

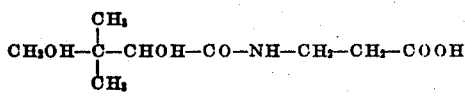

Science, volume 91, page 246 (1940). In addition there are other growth promoting substances with the same skeleton structure but containing more oxygen in the form of hydroxyl groups, which function in a similar manner.

While pantothenic acid has been made in relatively poor yield by condensing with β-alanine esters the lactone known as α-hydroxy β,β-dimethyl-γ-butyrolactone and having the formula

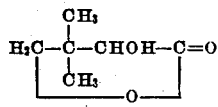

and in still poorer yields by condensing the above lactone with the sodium salt of β-alanine, I have found that under the proper conditions this lactone will react with β-alanine salts to produce good yields of the physiologically active principle.

The disadvantage of the use of β-alanine esters is that the esters themselves are difficult to make and are unstable, furthermore the yields obtained are unsatisfactory. Heretofore the yields obtained using β-alanine salts have been very low, but by use of the proper conditions we have increased the yield at least 500 percent above the best previously obtained.

A typical experiment exemplifying this improvement is described below.

10.5 milligrams of dry sodium salt of beta-alanine, prepared from beta-alanine and one equivalent of sodium hydroxide, was mixed with 12.3 milligrams of racemic α-hydroxy β,β-dimethyl-γ-butyrolactone (E. Glaser Montashefte f. Chemie, volume 25, page 46 (1904), M. Kohn and V. Neustädter Monatshefte f. Chemie, volume 39, page 293 (1918)) and heated for one hour at 95° to 97° C. Since the lactone melts under these conditions, mixing is facilitated by heating. At the end of the one hour heating the residue was tested and found by yeast assay to contain approximately 130 (gram) "units" of pantothenic acid (Roger J. Williams et al., Journal of the American Chemical Society, volume 60, page 2720 (1938)).

Assuming that one "unit" of the sodium salt of pantothenic acid weighs .08 mg., and taking into account that the lactone used was racemic and yields two optical antipodes of pantothenic acid, one of which is thought to be physiologically inactive, the yield in the above experiment was 10.4 milligrams of the physiologically active pantothenic acid or 20.8 milligrams of the racemic material. This is 92 percent of the theoretically possible yield.

The foregoing is cited as an example. Other experiments have been carried out using (1) different proportions of lactone and β-alanine salt, (2) slightly different temperatures, (3) a shorter period of heating and (4) an inert solvent—dioxane. In each case substantial improvement over previous yields was obtained, and it is not desired to limit the invention to the exact conditions specified above.

Good yields were obtained when either the lactone or the salt was in excess. Slightly lower temperatures yielded satisfactory results. A fifteen minute heating period gave a yield substantially lower than in the experiment cited and the use of the inert solvent, while included in the invention, is not essential to successful utilization of the improvement. Substantial yields were also obtained by heating dry β-alanine itself with the lactone in the same manner described above. It is important for the success of the experiments that the reagents be reasonably dry and that the use of alcohol or similar solvent be avoided. Too long heating should be avoided because of the destruction of pantothenic acid by heating in a dry condition or in the presence of weakly acid or basic media.

The invention is, further, not limited to the use of the racemic lactone. Antipodes react alike and the invention includes the use of either or both optical forms of the lactone. Furthermore, the invention is not limited to the use of the sodium salt of β-alanine, but likewise includes the use of other salts such as the lithium, potassium, calcium or barium salts.

An experiment parallel to the one cited above was performed using the lactone

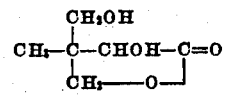

7.5 milligrams of this lactone was heated with 18 milligrams of the sodium salt of β-alanine at 95° C. for one hour. There was produced approximately 4.5 "units" of pantothenic acid or its physiological equivalent. In another experiment this lactone when heated with the sodium salt of beta-alanine in dioxane produced a substantially larger yield.

I claim:

1. The process which comprises heating at a temperature of at least about 95° C. a substantially dry mixture consisting of a compound having the formula:

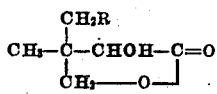

where R is a member of the group consisting of H and OH, and a member of the group consisting of β-alanine and alkali-forming metal salts thereof.

2. The process which comprises heating at a temperature sufficiently high to cause reaction a substantially dry mixture consisting of an alkali-forming metal salt of β-alanine and the lactone having the formula:

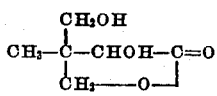

3. The process which comprises heating a substantially dry mixture consisting of α-hydroxy-β,β-dimethyl-γ-butyro lactone and a member of the group consisting of β-alanine and alkali-forming metal salts thereof at a temperature of at least about 95° C.

4. The process which comprises heating a substantially dry mixture consisting of α-hydroxy-β,β-dimethyl-γ-butyro lactone and an alkali-forming metal salt of β-alanine at a temperature sufficiently high to cause the lactone to melt.

5. The process which comprises heating a substantially dry mixture consisting of α-hydroxy-β,β-dimethyl-γ-butyro lactone and β-alanine at a temperature sufficiently high to cause reaction between the components of the mixture.

6. The process which comprises heating a substantially dry mixture consisting of α-hydroxy-β,β-dimethyl-γ-butyro lactone and an alkali-forming metal salt of β-alanine at a temperature of at least 95° C. until reaction between the components of the mixture is substantially complete.

7. The process which comprises heating a substantially dry mixture consisting of α-hydroxy-β,β-dimethyl-γ-butyro lactone and a member of the group consisting of β-alanine and the sodium salt of β-alanine at a temperature of about 95° to 97° C.

8. The process which comprises heating a substantially dry mixture consisting of α-hydroxy-β,β-dimethyl-γ-butyro lactone and the sodium salt of β-alanine at a temperature of at least about 95° C.

9. The process which comprises heating a substantially dry mixture consisting of α-hydroxy-β,β-dimethyl-γ-butyro lactone and the calcium salt of β-alanine at a temperature of at least about 95° C.

ROGER J. WILLIAMS.